US009189997B2

(12) United States Patent
Kimura et al.

(10) Patent No.: US 9,189,997 B2
(45) Date of Patent: Nov. 17, 2015

(54) DISPLAY DEVICE

(75) Inventors: Hajime Kimura, Atsugi (JP); Yasunori Yoshida, Atsugi (JP); Hideaki Shishido, Atsugi (JP); Atsushi Umezaki, Atsugi (JP); Makoto Yanagisawa, Ebina (JP); Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 346 days.

(21) Appl. No.: 13/443,146

(22) Filed: Apr. 10, 2012

(65) Prior Publication Data

US 2012/0194749 A1    Aug. 2, 2012

Related U.S. Application Data

(63) Continuation of application No. 11/730,634, filed on Apr. 3, 2007, now Pat. No. 8,159,449.

(30) Foreign Application Priority Data

Apr. 14, 2006    (JP) ................................. 2006-112533

(51) Int. Cl.
  *G09G 3/36*    (2006.01)
  *G09G 3/32*    (2006.01)
  (Continued)

(52) U.S. Cl.
  CPC ........ *G09G 3/3426* (2013.01); *G02F 1/133603* (2013.01); *G09G 3/3208* (2013.01);
  (Continued)

(58) Field of Classification Search
  CPC . G09G 3/3426; G09G 3/3648; G09G 3/3208; G09G 2320/066; G09G 2320/062; G09G 2320/0238; G09G 2300/046; G09G 2330/021; G02F 1/133603; G02F 1/1362
  USPC ............... 345/76–102; 349/69–84; 315/169.3
  See application file for complete search history.

(56) References Cited

U.S. PATENT DOCUMENTS 4,202,607 A    5/1980    Washizuka et al.
4,648,691 A    3/1987    Oguchi et al.
(Continued)

FOREIGN PATENT DOCUMENTS

CN    001300104 A    6/2001
CN    001314669 A    9/2001
(Continued)

OTHER PUBLICATIONS

Shieh, "Transflective Display by Hybrid OLED and LCD," LEOS 2005 (IEEE Lasers and Electro-Optics Society Annual Meeting), Oct. 22, 2005, pp. 650-651.
(Continued)

*Primary Examiner* — Rodney Amadiz
(74) *Attorney, Agent, or Firm* — Eric J. Robinson; Robinson Intellectual Property Law Office, P.C.

(57) ABSTRACT

It is an object to provide a display device in which a problem of light leakage from a liquid crystal element in black display is reduced or overcome and the contrast is improved. It is another object to provide a pixel circuit having a function to control a lighting state of a backlight based on each pixel. These objects are achieved by turning off a light-emitting element in display of a black gray scale, and by providing a light-emitting element in each pixel and providing, in a pixel circuit, a function to individually control lighting and non-lighting of the light-emitting element depending on a gray scale to perform display. When a backlight is provided in each pixel, a light-emitting element that is a backlight is turned off when a black gray scale is displayed, whereby reduction in contrast due to light leakage from a liquid crystal element can be prevented.

16 Claims, 12 Drawing Sheets

(51) Int. Cl.
  *G09G 3/34* (2006.01)
  *G02F 1/1335* (2006.01)
  *G02F 1/1362* (2006.01)

(52) U.S. Cl.
  CPC .......... *G09G3/3648* (2013.01); *G02F 1/1362* (2013.01); *G09G 2300/046* (2013.01); *G09G 2320/0238* (2013.01); *G09G 2320/062* (2013.01); *G09G 2320/066* (2013.01); *G09G 2330/021* (2013.01)

(56) References Cited

U.S. PATENT DOCUMENTS

| | | | |
|---|---|---|---|
| 4,772,885 A | 9/1988 | Uehara et al. | |
| 6,188,458 B1 | 2/2001 | Tagusa et al. | |
| 6,714,268 B2 | 3/2004 | Wang et al. | |
| 6,894,431 B2 | 5/2005 | Yamazaki et al. | |
| 6,912,021 B2 | 6/2005 | Kimura | |
| 6,965,361 B1 * | 11/2005 | Sheats et al. | 345/82 |
| 6,967,649 B2 | 11/2005 | Sun | |
| 7,006,171 B1 * | 2/2006 | Koden et al. | 349/61 |
| 7,038,394 B2 | 5/2006 | Yamashita | |
| 7,071,488 B2 | 7/2006 | Kimura | |
| 7,084,936 B2 | 8/2006 | Kato | |
| 7,145,289 B2 | 12/2006 | Yamazaki et al. | |
| 7,187,355 B2 | 3/2007 | Tam et al. | |
| 7,460,103 B2 | 12/2008 | Konno et al. | |
| 7,514,864 B2 | 4/2009 | Yamazaki et al. | |
| 7,554,514 B2 | 6/2009 | Nozawa | |
| 7,572,718 B2 | 8/2009 | Kanno et al. | |
| 8,049,419 B2 | 11/2011 | Yamazaki et al. | |
| 8,319,424 B2 | 11/2012 | Yamazaki et al. | |
| 8,716,933 B2 | 5/2014 | Yamazaki et al. | |
| 2002/0030996 A1 | 3/2002 | Sakakibara | |
| 2002/0033908 A1 | 3/2002 | Mori et al. | |
| 2002/0033917 A1 | 3/2002 | Hoshino | |
| 2002/0041348 A1 | 4/2002 | Yokoyama et al. | |
| 2002/0085143 A1 | 7/2002 | Kim et al. | |
| 2002/0130985 A1 | 9/2002 | Weindorf et al. | |
| 2002/0140659 A1 | 10/2002 | Mikami et al. | |
| 2003/0030603 A1 | 2/2003 | Shimoda | |
| 2003/0030633 A1 | 2/2003 | Chou et al. | |
| 2003/0052869 A1 | 3/2003 | Fujii et al. | |
| 2003/0103021 A1 | 6/2003 | Young et al. | |
| 2003/0193457 A1 | 10/2003 | Wang et al. | |
| 2003/0201960 A1 * | 10/2003 | Fujieda | 345/87 |
| 2004/0008178 A1 | 1/2004 | Kato | |
| 2004/0095306 A1 | 5/2004 | Fujiyoshi | |
| 2004/0140972 A1 | 7/2004 | Hirota et al. | |
| 2004/0169786 A1 | 9/2004 | Yamazaki et al. | |
| 2004/0201554 A1 | 10/2004 | Satoh | |
| 2005/0110786 A1 | 5/2005 | Inoue et al. | |
| 2005/0156828 A1 | 7/2005 | Yamashita et al. | |
| 2005/0225254 A1 | 10/2005 | Takai et al. | |
| 2006/0022921 A1 | 2/2006 | Miyake et al. | |
| 2006/0072047 A1 | 4/2006 | Sekiguchi | |
| 2008/0180618 A1 | 7/2008 | Fujieda | |

FOREIGN PATENT DOCUMENTS

| | | |
|---|---|---|
| EP | 1109224 A | 6/2001 |
| EP | 1 380 876 A | 1/2004 |
| JP | 61-087381 A | 5/1986 |
| JP | 07-092451 A | 4/1995 |
| JP | 08-166589 A | 6/1996 |
| JP | 08-172219 A | 7/1996 |
| JP | 09-090404 A | 4/1997 |
| JP | 10-163536 A | 6/1998 |
| JP | 10-207400 A | 8/1998 |
| JP | 11-095251 A | 4/1999 |
| JP | 2002-090737 A | 3/2002 |
| JP | 2002-091385 A | 3/2002 |
| JP | 2002-141492 A | 5/2002 |
| JP | 2002-196702 A | 7/2002 |
| JP | 2002-286921 A | 10/2002 |
| JP | 2002-323867 A | 11/2002 |
| JP | 2003-066929 A | 3/2003 |
| JP | 2003-162229 A | 6/2003 |
| JP | 2003-279983 A | 10/2003 |
| JP | 2003-316295 A | 11/2003 |
| JP | 2003-322850 A | 11/2003 |
| JP | 2004-045771 A | 2/2004 |
| JP | 2004-212923 A | 7/2004 |
| JP | 2004-233444 A | 8/2004 |
| JP | 2005-235566 A | 9/2005 |
| JP | 2005-333118 A | 12/2005 |
| JP | 2006-030588 A | 2/2006 |
| JP | 2006-039298 A | 2/2006 |
| WO | WO 0060408 A1 * | 10/2000 |
| WO | WO-2004/053819 | 6/2004 |

OTHER PUBLICATIONS

Search Report (Application No. 07006970.3) dated Apr. 21, 2008.
Office Action (Application No. 07006970.3) dated Dec. 21, 2009.
Chinese Office Action (Application No. 201210383139.X) Dated May 6, 2014.
Cinese Office Action (Application No. 201210383139.X) Dated Sep. 18, 2015.

* cited by examiner

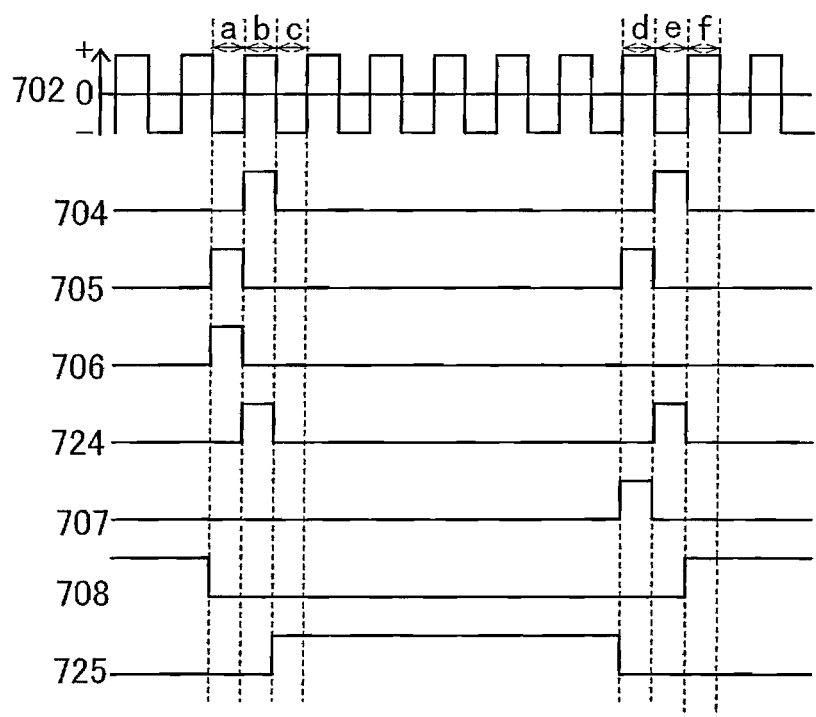

DISPLAY DEVICE

BACKGROUND OF THE INVENTION

1. Field of the Invention

The present invention relates to a liquid crystal display device, and particularly, a structure of a pixel including a liquid crystal and a backlight.

2. Description of the Related Art

A liquid crystal display device is formed by a combination of a liquid crystal panel in which a liquid crystal is sandwiched between a pair of substrates and a lighting system called a backlight on a rear side of the liquid crystal panel. As for the liquid crystal panel, a simple matrix mode and an active matrix mode using a thin film transistor (TFT) are known (refer to Patent Document 1: Japanese Published Patent Application No. H9-90404). In either mode, a voltage which is applied to electrodes sandwiching the liquid crystal is controlled, and the quantity of transmitted light of the backlight which illuminates the entire surface of the liquid crystal panel is adjusted, whereby an image is displayed. Therefore, for example, also in a case of black display in all the pixels, the backlight is always turned on and the power is kept being consumed.

Meanwhile, a liquid crystal display device using a light-emitting diode (LED) as a backlight is provided. The LED has advantages such as the long lifetime, no need of an inverter since it can be directly driven by a low-voltage direct current power source, low power consumption, and the like. As for such a backlight, a directly-below type and a sidelight type are known as a position of the LED. In a directly-below type, the LED is positioned directly below the liquid crystal panel, and the LED emits light uniformly on the surface using a diffusing plate or the like. In addition, in a sidelight type, the LED emits light from the side surface of the panel, and the light is supplied to the liquid crystal panel through a light-guiding plate or a diffusing plate; thus, the sidelight type can be formed thinly compared to a directly-below type, which is an advantage.

SUMMARY OF THE INVENTION

In a conventional transmission display device using a liquid crystal, light from a backlight is uniformly emitted to a rear side of the liquid crystal. Therefore, even when black is intended to be displayed, light leaks from a liquid crystal element, and completely black display cannot be performed, which leads to the reduced contrast.

It is an object of the present invention to provide a display device in which a problem of light leakage from a liquid crystal element in black display is overcome and the contrast is improved.

In the present invention, the above object is achieved by turning off a light-emitting element when a black gray scale is displayed. In addition, in the present invention, the above object is also achieved by a light-emitting element provided in each pixel and a function in a pixel circuit to individually control lighting and non-lighting of the light-emitting element depending on a gray scale to perform display.

One aspect of the present invention is a display device including a light-emitting element provided so as to overlap with a liquid crystal element in a pixel, where light-emission of the light-emitting element passes through the liquid crystal element. In this display device, the liquid crystal element is electrically connected to a data line to which a potential based on an analog signal is applied, a comparator which compares a potential of the data line with a reference potential is provided, and the light-emitting element is electrically connected to the comparator.

In the display device proposed in the present invention, a case is considered, where a liquid crystal element is driven by an analog data signal which is changed to be positive and negative. Conventionally, there has been a driving method in which an analog potential that is set in accordance with characteristics of the liquid crystal element is written as a data potential when a gray scale is displayed. In the liquid crystal element, transmitted light is controlled by a potential difference between a pixel electrode and a counter electrode, and a direction of voltage application is not particularly related. Therefore, a method for inverting a voltage value of a data signal to be positive and negative for input has been conventionally used from a problem of the lifetime of a liquid crystal or the like. At this time, there are positive and negative data potentials which perform the same gray scale display.

One aspect of the present invention is a display device including a pixel portion having a light-emitting element and a liquid crystal element provided so as to overlap with the light-emitting element; a data line electrically connected to the liquid crystal element, to which a potential based on an analog signal is applied; and a comparator electrically connected to the data line and the light-emitting element. In accordance with the present invention, in a display device using a liquid crystal, a backlight is made not to emit light when black is displayed; therefore, light leakage can be eliminated and the contrast can be improved.

Another aspect of the present invention is a display device including a pixel portion having a light-emitting element and a liquid crystal element provided so as to overlap with the light-emitting element; a data line electrically connected to the liquid crystal element, to which a potential based on an analog signal is applied; a first comparator electrically connected to the data line and the light-emitting element; a second comparator electrically connected to the data line and the light-emitting element; a first switch electrically connected to the data line and the first comparator; and a second switch electrically connected to the data line and the second comparator. In accordance with the present invention, in a display device using a liquid crystal, a backlight is made not to emit light when black is displayed; therefore, light leakage can be eliminated and the contrast can be improved. In addition, a function to control a lighting state of a light-emitting element based on each pixel is provided in a pixel circuit; therefore, a malfunction can be avoided, in which, when a backlight is turned off for a pixel displaying black, all other pixels also display black.

Another aspect of the present invention is a method for driving a display device which includes a pixel portion having a light-emitting element and a liquid crystal element provided so as to overlap with the light-emitting element; a data line electrically connected to the liquid crystal element, to which a potential based on an analog signal is applied; and a comparator electrically connected to the data line and the light-emitting element, including the steps of comparing a potential of the data line with a reference potential in the comparator; and controlling light-emission of the light-emitting element based on a comparison result by the comparator. In accordance with the present invention, in a display device using a liquid crystal, a backlight is made not to emit light when black is displayed; therefore, light leakage can be eliminated and the contrast can be improved.

Another aspect of the present invention is a method for driving a display device which includes a pixel portion having a light-emitting element and a liquid crystal element provided so as to overlap with the light-emitting element; a data line electrically connected to the liquid crystal element, to which a potential based on an analog signal is applied; a first comparator and a second comparator each electrically connected to the data line and the light-emitting element; a first switch electrically connected to the data line and the first comparator; and a second switch electrically connected to the data line and the second comparator, including the steps of comparing a potential of the data line with a first reference potential in the first comparator by turning on the first switch when the potential of the data line has a negative value; comparing a potential of the data line with a second reference potential in the second comparator by turning on the second switch when the potential of the data line has a positive value; and controlling light-emission of the light-emitting element based on a comparison result by the first comparator or a comparison result by the second comparator. In accordance with the present invention, in a display device using a liquid crystal, a backlight is made not to emit light when black is displayed; therefore, light leakage can be eliminated and the contrast can be improved. In addition, a function to control a lighting state of a light-emitting element based on each pixel is provided in a pixel circuit; therefore, a malfunction can be avoided, in which, when a backlight is turned off for a pixel displaying black, all other pixels also display black.

In addition, another aspect of the present invention is an electronic device having a feature that the above display device is included in a display portion.

In the present invention, "to be connected" also indicates "to be electrically connected". Accordingly, in a structure disclosed in the present invention, other elements capable of electrical connection (such as other elements and a switch) may be arranged, in addition, between predetermined connected components.

It is to be noted that an element provided in a pixel is not limited to a specific light-emitting element. A light-emitting element provided in a pixel may be any light-emitting element such as an EL (Electroluminescence) element or an element used in a field emission display (FED), an SED (Surface-conduction Electron-emitter Display) that is one kind of FED, a plasma display panel (PDP), or a piezoelectric ceramic display.

In a transistor, it is difficult to distinguish between a source and a drain because of its structure. Further, there is also a case where levels of a potential are switched depending on an operation of a circuit. Therefore, in this specification, a source and a drain are each referred to as a first terminal or a second terminal without particular limitation. For example, when the first terminal is a source, the second terminal is a drain, and on the other hand, when the first terminal is a drain, the second terminal is a source.

In the present invention, a type of an applicable transistor is not limited. It is thus possible to apply a thin film transistor (TFT) using a non-single crystal semiconductor film typified by amorphous silicon and polycrystalline silicon, a transistor formed using a semiconductor substrate or an SOI (Silicon On Insulator) substrate, a MOS transistor, a junction type transistor, a bipolar transistor, a transistor using an organic semiconductor or a carbon nanotube, or other transistors. Further, a type of a substrate over which a transistor is arranged is not limited, and a transistor can be arranged over a single crystal substrate, an SOI substrate, a glass substrate, or the like.

In the present invention, a comparator may be an operation amplifier, a chopper inverter circuit, or the like, that is, any circuit can be used as long as a function as a comparator can be achieved.

In the present invention, when black is displayed in a display device using a liquid crystal, a backlight is made not to emit light; therefore, light leakage can be eliminated and the contrast can be improved. In addition, in the present invention, a backlight is arranged in each pixel and a function to control a lighting state of a light-emitting element based on each pixel is provided in a pixel circuit; therefore, a malfunction can be avoided, in which, when a backlight is turned off for a pixel displaying black, all other pixels also display black. Moreover, a backlight in a portion where lighting is not needed can be individually turned off; therefore, power savings can be effectively achieved.

In a conventional liquid crystal display device, a plurality of pixels use the same backlight as a light-emitting source. Therefore, a malfunction is generated, in which, when a backlight is turned off for a pixel displaying black, all other pixels also display black. However, in the present invention, a backlight is provided in each pixel; therefore, a light-emitting element that is a backlight can be turned off when a black gray scale is displayed, and reduction in contrast due to light leakage from a liquid crystal element can be prevented.

BRIEF DESCRIPTION OF THE DRAWINGS

In the accompanying drawings:

FIG. 8 is a diagram showing a timing chart of a setting-operation of a pixel according to the present invention;

DESCRIPTION OF THE INVENTION

Figure 1A:
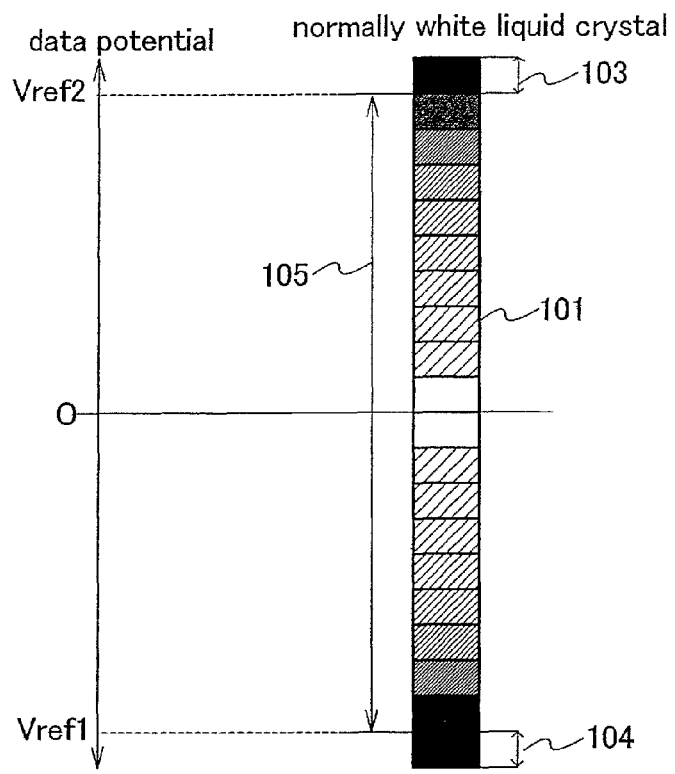
FIGS. 1A and 1B are diagrams each showing a relation between a range in which a light-emitting element emits light and a data potential in the present invention.

Hereinafter, Embodiment Modes of the present invention will be explained with reference to the accompanying drawings. It is to be noted that the present invention can be implemented in various modes, and it is easily understood by those skilled in the art that modes and details thereof can be modified in various ways without departing from the spirit and the scope of the present invention. Therefore, the present invention should not be interpreted as being limited to the following description of the embodiment modes. In all the drawings for explaining the embodiment modes, the same portions or portions having similar functions are denoted by the same reference numerals, and repeated explanation thereof will be omitted.

Figure 1B:
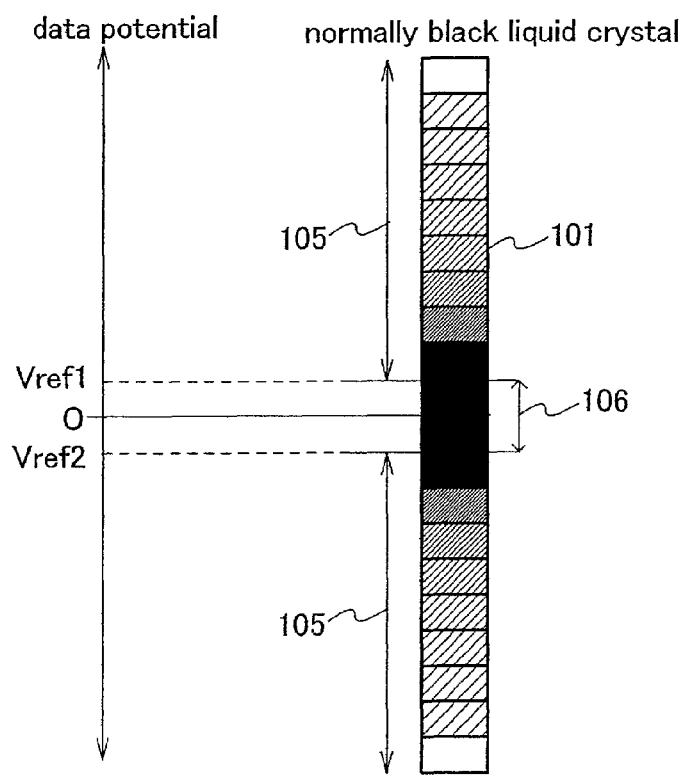

The upper limit or the lower limit of a range of a data voltage, which has a completely black gray scale, is defined as a reference potential, and lighting or non-lighting of a light-emitting element is selected by comparison of a data potential with the reference potential. FIGS. 1A and 1B each show a method for setting a reference potential. FIG. 1A shows a method for setting a reference potential in a liquid crystal having a normally white display mode (hereinafter referred to as a normally white liquid crystal). The normally white display mode is a polarized state in which light is transmitted in a state where no voltage is applied to a liquid crystal element. In a gray scale 101 of the liquid crystal element, the upper limit of a range 104 of a data voltage, in which completely black display is performed in a negative voltage region, is defined as a reference potential Vref1. In addition, the lower limit of a range 103 of a data voltage, in which completely black display is performed in a positive voltage region, is defined as a reference potential Vref2.

On the other hand, a normally black display mode is a polarized state in which light is transmitted in a state where a voltage is applied to a liquid crystal element. In a manner similar to the above, FIG. 1B shows a method for setting a reference potential in a liquid crystal having a normally black display mode (hereinafter referred to as a normally black liquid crystal). As can be seen in FIG. 1B, in the normally black liquid crystal, a range 106 of a data voltage, in which completely black display is performed, exists only around 0 V. In a gray scale 101 of the liquid crystal element, the upper limit of the range 106 of a data voltage, in which completely black display is performed, is defined as a reference potential Vref1. In addition, the lower limit of the range 106 of a data voltage, in which completely black display is performed, is defined as a reference potential Vref2.

In FIGS. 1A and 1B, it is necessary to provide, in a pixel circuit, a circuit which judges whether a data potential is in a range 105 of a data voltage, in which a light-emitting element emits light. In the present invention, a circuit which compares the data potential with the reference potential is used, and the light-emitting element is made to emit light in a case where the data potential is lower than Vref2 or the data potential is higher than Vref1.

Embodiment Mode 1

Figure 2:
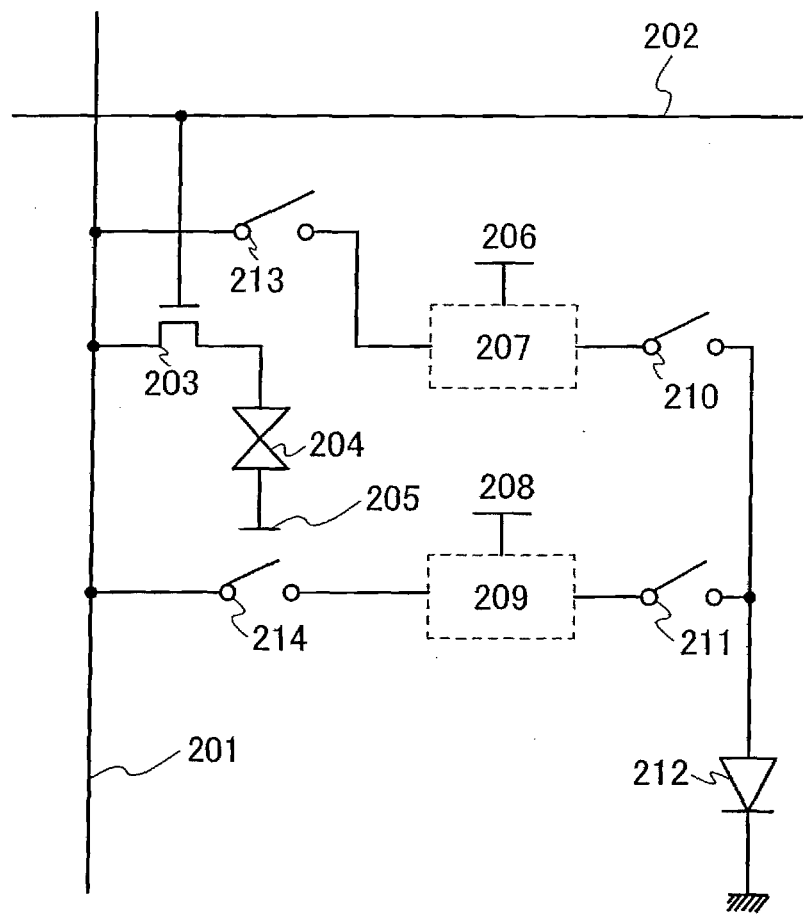
FIG. 2 is a circuit diagram schematically showing a pixel circuit of a display device according to the present invention.

FIG. 2 schematically shows one embodiment mode of a pixel included in a display device of the present invention. In a circuit shown in FIG. 2, a data line 201 and a scanning line 202 are provided; a transistor 203 which performs writing to a liquid crystal element 204 and a counter electrode 205 are provided; a light-emitting element 212 used as a backlight, and a first comparator 207 and a second comparator 209 are provided; and a first switch 213 for writing a data signal into the first comparator 207 and a second switch 214 for writing a data signal into the second comparator 209 are provided. A first reference potential 206 that is compared with a data potential is input to the first comparator 207, and a second reference potential 208 that is compared with a data potential is input to the second comparator 209. In addition, a third switch 210 and a fourth switch 211, by which it is determined which of the first comparator 207 and the second comparator 209 is selected to transmit output to the light-emitting element 212, are provided.

The components in the circuit shown in FIG. 2 are connected as follows. A first terminal of the transistor 203 is connected to the data line 201, and a first electrode of the liquid crystal element 204 is connected to a second terminal of the transistor 203. A gate terminal of the transistor 203 is connected to the scanning line 202. A second electrode of the liquid crystal element 204 is connected to the counter electrode 205. Input of the first comparator 207 is connected to the data line 201 through the first switch 213, and output of the first comparator 207 is connected to a first electrode of the light-emitting element 212 through the third switch 210. Further, input of the second comparator 209 is connected to the data line 201 through the second switch 214, and output of the second comparator 209 is connected to the first electrode of the light-emitting element 212 through the fourth switch 211. It is to be noted that the first reference potential 206 which is compared with a data potential is applied to the first comparator 207, and the second reference potential 208 is similarly applied to the second comparator 209.

Next, an operation of the circuit will be briefly explained. A data potential written into the liquid crystal element 204 from the data line 201 is input to the second comparator 209 and the first comparator 207. The first comparator 207 compares the data potential input from the data line with the first reference potential 206. In addition, the second comparator 209 compares the data potential input from the data line with the second reference potential 208.

The first switch 213 writes a signal from the data line 201 into the first comparator 207, and the second switch 214 writes a signal from the data line 201 into the second comparator 209.

By the third switch 210 and the fourth switch 211, one of output of the first comparator 207 and output of the second comparator 209 is selected, and the output is transmitted to the light-emitting element 212. Therefore, it is necessary to set an operation timing appropriately so as not to turn on the third switch 210 and the fourth switch 211 at the same time.

Figure 10A:
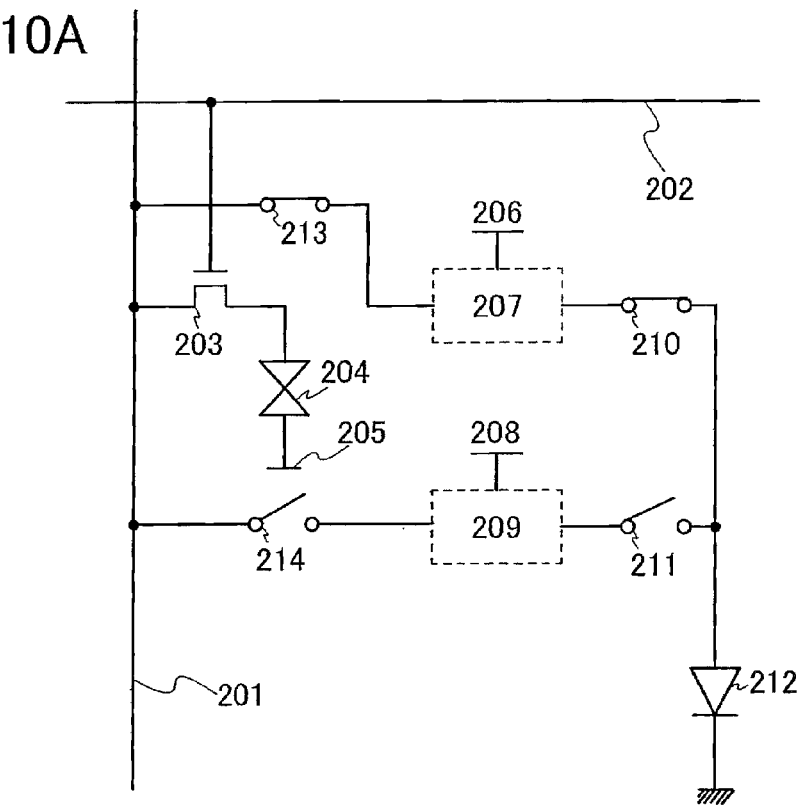
FIGS. 10A and 10B are diagrams each showing an operation of a pixel circuit of a display device according to the present invention.
Figure 10B:
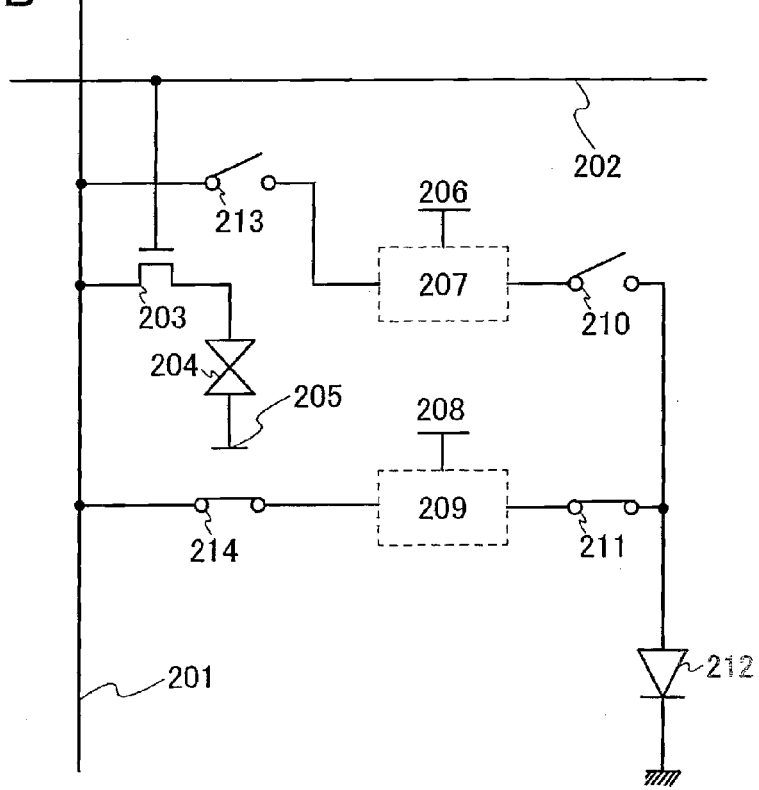

FIGS. 10A and 10B show operations of the circuit shown in FIG. 2. FIG. 10A shows an operation in a case where a negative potential is loaded from the data line 201 to the comparator. The first switch 213 is turned on, a data potential is written into the first comparator 207, the data potential is compared with the first reference potential 206 in the first comparator 207, and the third switch 210 is turned on so that output of the first comparator 207 is output to the light-emitting element 212. During this operation, the second switch 214 and the fourth switch 211 which are connected to input and output of the second comparator 209 respectively are turned off. FIG. 10B shows an operation in a case where a positive potential is loaded from the data line 201 to the comparator. The second switch 214 is turned on, a data potential is written into the second comparator 209, the data potential is compared with the second reference potential 208 in the second comparator 209, and the fourth switch 211 is turned on so that output of the second comparator 209 is output to the light-emitting element 212. During this operation, the first switch 213 and the third switch 210 which are connected to input and output of the first comparator 207 respectively are turned off.

It is to be noted that the light-emitting element 212 may be an LED, an organic EL element, or the like. That is, any light-emitting element which can be controlled by a voltage, a current, or the like may be used.

It is to be noted that the switch can be an electrical switch or a mechanical switch. That is, any switch may be used as long as it can control a current flow, and the switch may be a transistor, a diode, or a logic circuit combining a transistor and a diode. Therefore, in a case where a transistor is used as the switch, polarity (conductivity type) thereof is not particularly limited because the transistor operates just as a switch. However, when a low off-state current is desired, a transistor of polarity with a lower off-state current is desirably used. For example, a transistor which is provided with an LDD region, a transistor which has a multi-gate structure, or the like has a low off-state current. Further, it is desirable that an n-channel transistor be employed when a potential of a source terminal of a transistor operating as a switch is close to a potential of a low potential side power source (such as VSS, GND, or 0 V), while a p-channel transistor be employed when the potential of the source terminal is close to a potential of a high potential side power source (such as VDD). This allows the transistor to operate as a switch with higher precision since an absolute value of a gate-source voltage can be increased. It is to be noted that a CMOS type switch using both an n-channel transistor and a p-channel transistor may also be used.

VDD is regarded as a high power source potential, and VSS is regarded as a low power source potential. Here, the high power source potential VDD is to be higher than the low power source potential VSS.

Figure 3:
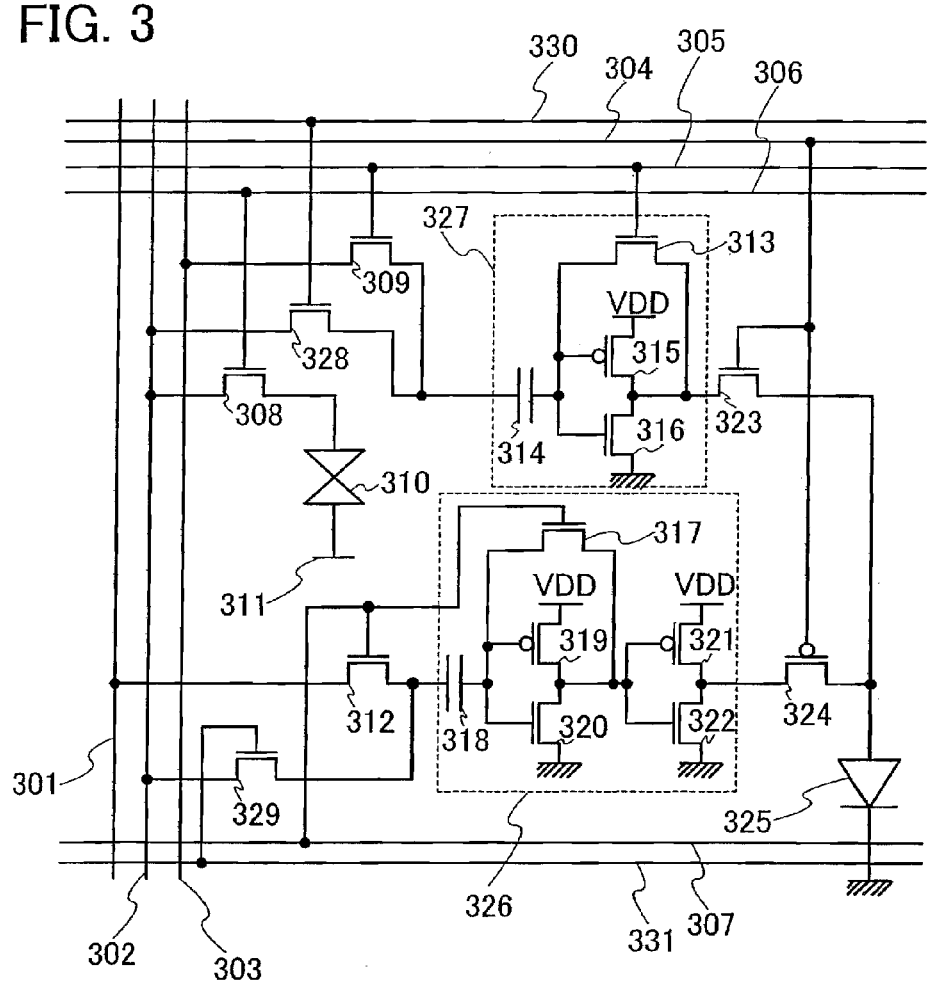
FIG. 3 is a circuit diagram showing a pixel circuit of a display device according to the present invention.

FIG. 3 shows an example of a detailed circuit diagram of the pixel shown in FIG. 2. The circuit shown in FIG. 3 has a feature in that two CMOS chopper inverter circuits are used as comparators. In other words, a first comparator 326 and a second comparator 327 are used. The first comparator 326 includes a first capacitor element 318; a first transistor 317; a first inverter including a second transistor 319 and a third transistor 320; and a second inverter including a fourth transistor 321 and a fifth transistor 322. The second comparator 327 includes a second capacitor element 314; a sixth transistor 313; and a third inverter including a seventh transistor 315 and an eighth transistor 316. As a wiring, a first reference potential line 301, a second reference potential line 303, and a data line 302 are provided. In addition, a scanning line 306, a first comparator initializing line 307, a second comparator initializing line 305, a comparator selecting line 304, a first data loading line 331, and a second data loading line 330 are provided. A ninth transistor 308 which writes a data voltage into a liquid crystal element 310 and a counter electrode 311 of the liquid crystal element are provided. A tenth transistor 312 and an eleventh transistor 329 which perform writing to the first comparator 326 are provided. A twelfth transistor 309 and a thirteenth transistor 328 which perform writing to the second comparator 327 are provided. Further, a fourteenth transistor 324 which transmits output of the first comparator 326 to a light-emitting element 325 and a fifteenth transistor 323 which transmits output of the second comparator 327 to the light-emitting element 325 are provided. It is to be noted that the second transistor 319 is a p-channel transistor and the third transistor 320 is an n-channel transistor; the fourth transistor 321 is a p-channel transistor and the fifth transistor 322 is an n-channel transistor; and the seventh transistor 315 is a p-channel transistor and the eighth transistor 316 is an n-channel transistor.

The components in FIG. 3 are connected as follows. A first terminal of the ninth transistor 308, a first terminal of the thirteenth transistor 328, and a first terminal of the eleventh transistor 329 are connected to the data line 302. A second terminal of the ninth transistor 308 is connected to a first electrode of the liquid crystal element 310, and a gate terminal of the ninth transistor 308 is connected to the scanning line 306. The counter electrode 311 is connected to a second electrode of the liquid crystal element 310. A first terminal of the twelfth transistor 309 is connected to the second reference potential line 303. A second terminal of the thirteenth transistor 328 and a second terminal of the twelfth transistor 309 are connected to a first electrode of the second capacitor element 314 in the second comparator 327. A gate terminal of the thirteenth transistor 328 is connected to the second data loading line 330, and a gate terminal of the twelfth transistor 309 is connected to the second comparator initializing line 305. The seventh transistor 315 and the eighth transistor 316 form an inverter. A gate terminal of the seventh transistor 315 and a gate terminal of the eighth transistor 316 are connected to a second electrode of the second capacitor element 314 and a first terminal of the sixth transistor 313. A second terminal of the seventh transistor 315 and a second terminal of the eighth transistor 316 are connected to a second terminal of the sixth transistor 313 and a first terminal of the fifteenth transistor 323. A gate terminal of the sixth transistor 313 is connected to the second comparator initializing line 305.

A first terminal of the tenth transistor 312 is connected to the first reference potential line 301. A gate terminal of the tenth transistor 312 is connected to the first comparator initializing line 307. A second terminal of the eleventh transistor 329 and a second terminal of the tenth transistor 312 are connected to a first electrode of the first capacitor element 318 in the first comparator 326. A gate terminal of the eleventh transistor 329 is connected to the first data loading line 331. The second transistor 319 and the third transistor 320 form an inverter. A gate terminal of the second transistor 319 and a gate terminal of the third transistor 320 are connected to a second electrode of the first capacitor element 318 and a first terminal of the first transistor 317. In addition, a second terminal of the second transistor 319 and a second terminal of the third transistor 320 are connected to a second terminal of the first transistor 317 and gate terminals of the fourth transistor 321 and the fifth transistor 322 which form another inverter. A second terminal of the fourth transistor 321 and a second terminal of the fifth transistor 322 are connected to a first terminal of the fourteenth transistor 324. A gate terminal of the first transistor 317 is connected to the first comparator initializing line 307.

A gate terminal of the fifteenth transistor 323 and a gate terminal of the fourteenth transistor 324 are connected to the comparator selecting line 304. A second terminal of the fifteenth transistor 323 and a second terminal of the fourteenth transistor 324 are connected to a first electrode of the light-emitting element 325.

Then, an operation of this pixel circuit will be explained. The first comparator 326 compares a potential Vref1 of the first reference potential line 301 with a potential of the data line 302 when a negative voltage is applied to the liquid crystal element 310. If the potential of the data line 302 is higher than Vref1, a power source voltage VDD is output. On the other hand, if the potential of the data line 302 is lower than Vref1, 0 V is output. The second comparator 327 compares a potential Vref2 of the second reference potential line 303 with a potential of the data line 302 when a positive voltage is applied to the liquid crystal element 310. If the potential of the data line 302 is lower than Vref2, a power source voltage VDD is output. On the other hand, if the potential of the data line 302 is higher than Vref2, 0 V is output. A detailed operation in the comparator will be explained later. In this embodiment mode, a CMOS chopper inverter circuit is used as a comparator; however, any circuit may be used as long as its function is achieved.

The fifteenth transistor 323 is a switch for determining whether the output of the second comparator 327 is output to the light-emitting element 325. Similarly, the fourteenth transistor 324 is a switch for determining whether the output of the first comparator 326 is output to the light-emitting element 325. For example, in the case of the normally white liquid crystal, a signal may be given to the comparator selecting line 304 so that the fifteenth transistor 323 is turned on when the potential of the data line 302 is positive, and the fourteenth transistor 324 is turned on when the potential of the data line 302 is negative. In addition, in the case of the normally black liquid crystal, a signal may be given to the comparator selecting line 304 so that the fifteenth transistor 323 is turned on when the potential of the data line 302 is negative, and the fourteenth transistor 324 is turned on when the potential of the data line 302 is positive. A period during which either the fifteenth transistor 323 or the fourteenth transistor 324 is turned on by a signal from the comparator selecting line 304 is regarded as a period during which the scanning line 306 is active, a data potential is loaded to the pixel circuit, and either the first comparator 326 or the second comparator 327 is initialized. The fifteenth transistor 323 and the fourteenth transistor 324 are required to have different polarity (conductivity type) from each other so that they are not turned on at the same time. A detailed operation timing of each transistor will be described later.

When a signal is input to the second comparator initializing line 305, the twelfth transistor 309 is turned on, and Vref2 is loaded to initialize the second comparator 327. When a signal is input to the first comparator initializing line 307, the tenth transistor 312 is turned on, and Vref1 is loaded to initialize the first comparator 326. It is necessary to set timings appropriately to input signals to the first comparator initializing line 307 and the second comparator initializing line 305 so that the twelfth transistor 309 and the tenth transistor 312 are not turned on at the same time.

The thirteenth transistor 328 and the eleventh transistor 329 write a data potential, which is written into the liquid crystal element 310, into the initialized comparators. The thirteenth transistor 328 writes a data potential into the second comparator 327 when the data potential is positive, and the eleventh transistor 329 writes a data potential into the first comparator 326 when the data potential is negative. A timing which turns on either the thirteenth transistor 328 or the eleventh transistor 329 is required to be synchronized with a timing which makes the scanning line 306 active and turns on the ninth transistor 308 which performs writing to the liquid crystal element. Details of the timings will be described later.

Figure 4A:
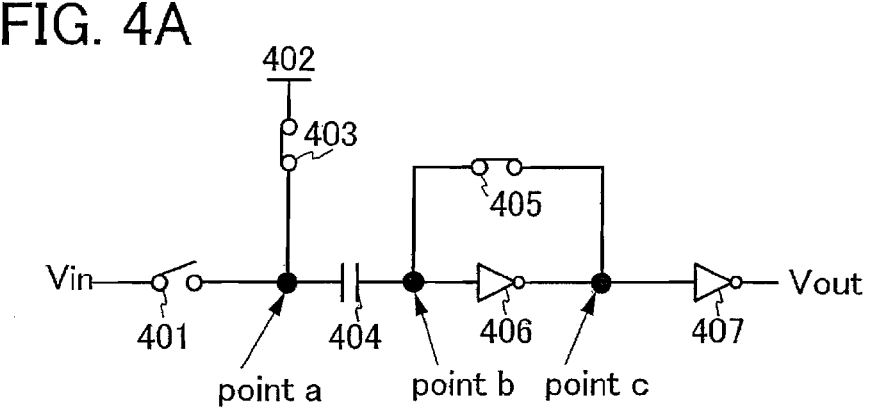
FIGS. 4A to 4C are circuit diagrams each showing an operation of a comparator provided in a pixel circuit of a display device according to the present invention.
Figure 4B:
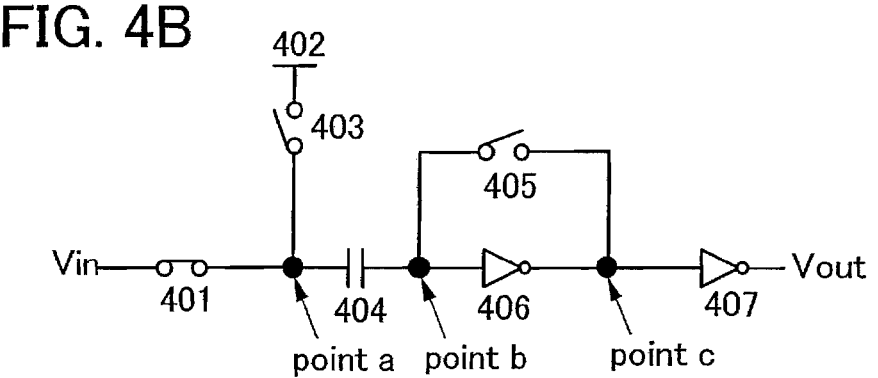

FIGS. 4A and 4B are diagrams each explaining an operation of the first comparator 326 shown in FIG. 3. Each element shown in FIGS. 4A and 4B corresponds to the element shown in FIG. 3. A first switch 401, a second switch 403, and a third switch 405 show operations of the eleventh transistor 329, the tenth transistor 312, and the first transistor 317, respectively. In addition, a reference potential 402 corresponds to Vref1. A first inverter 406 corresponds to the inverter including the second transistor 319 and the third transistor 320. Further, a second inverter 407 corresponds to the inverter including the fourth transistor 321 and the fifth transistor 322. An input voltage Vin indicates an input voltage from the data line 302.

First, as shown in FIG. 4A, the second switch 403 and the third switch 405 are turned on, and the first switch 401 is turned off, whereby the comparator is initialized. At this time, a potential of a logic threshold value (hereinafter denoted by Vth_inv) of the first inverter 406 is applied to a point b. When the reference potential 402 is Vref1, Vref1 is applied to a point a. Thus, a voltage of Vref1−Vth_inv is retained between both electrodes of a capacitor 404. It is to be noted that the logic threshold value of the inverter is defined as a voltage which makes an input voltage and an output voltage of the inverter equal to each other. The comparator is required to be initialized because the logic threshold value of the inverter possibly varies from one pixel to another pixel due to variation in size or threshold value of the transistor included in the inverter. Initialization of the comparator can eliminate an adverse effect due to the logic threshold value of the inverter, which varies from one pixel to another pixel.

Next, as shown in FIG. 4B, the second switch 403 and the third switch 405 are turned off, and the first switch 401 is turned on. At this time, a potential at the point a is equivalent to an input voltage Vin. A potential at the point b falls from the potential at the point a by the voltage retained between the both electrodes of the capacitor 404 and becomes Vin−(Vref1−Vth_inv), which is represented by the following expression (1).

$$\text{Vin}+\text{Vth\_inv}-\text{Vref1} \quad (1)$$

It is found that a potential at a point c that is output of the first inverter 406 (referred to as Vc) is determined depending on which of the potential at the point b (referred to as Vb) represented by the expression (1) and Vth_inv is high. In the case of Vb>Vth_inv, 0 V is output as Vc. At this time, logic is further inverted by the second inverter 407 so that a power source voltage VDD is output as an output voltage Vout. On the other hand, in the case of Vb<Vth_inv, VDD is output as Vc, and logic is further inverted by the second inverter 407 so that 0 V is output as Vout. As described above, it is found that VDD is output in the case of Vin>Vref1, and 0 V is output in the case of Vin<Vref1.

Figure 4C:
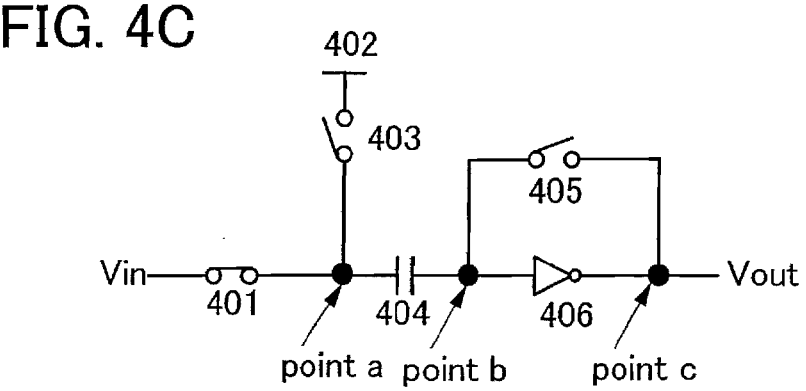

FIG. 4C is a diagram explaining an operation of the second comparator 327. The operation of the second comparator 327 is different from that of the first comparator 326 in that the inverter 407 is not provided, and the potential at the point c is equivalent to a value of the output voltage Vout. Each element shown in FIG. 4C corresponds to the element shown in FIG. 3. A first switch 401, a second switch 403, and a third switch 405 show operations of the thirteenth transistor 328, the twelfth transistor 309, and the sixth transistor 313, respectively. In addition, a reference potential 402 corresponds to Vref2. An inverter 406 corresponds to the inverter including the seventh transistor 315 and the eighth transistor 316. An input voltage Vin indicates an input voltage from the data line 302.

Initialization of the comparator is the same as that shown in FIG. 4A, and explanation thereof will thus be omitted. It is to be noted that, in the second comparator 327, as the reference potential 402, the potential Vref1 input from the first reference potential line 301 is replaced with the potential Vref 2 input from the second reference potential line 303. When the comparator is initialized, a voltage of Vref2−Vth_inv is retained between both electrodes of a capacitor 404, and Vb=Vth_inv is achieved. Here, as shown in FIG. 4C, the second switch 403 and the third switch 405 are turned off, and the first switch 401 is turned on. At this time, a potential at a point a is equivalent to an input voltage Vin, and Vb has a value represented by the following expression (2). As described above, in the case of Vin>Vref2, 0 V is output as Vout. On the other hand, in the case of Vin<Vref2, VDD is output as Vout.

$$\text{Vin}+\text{Vth\_inv}-\text{Vref2} \quad (2)$$

Figure 5:
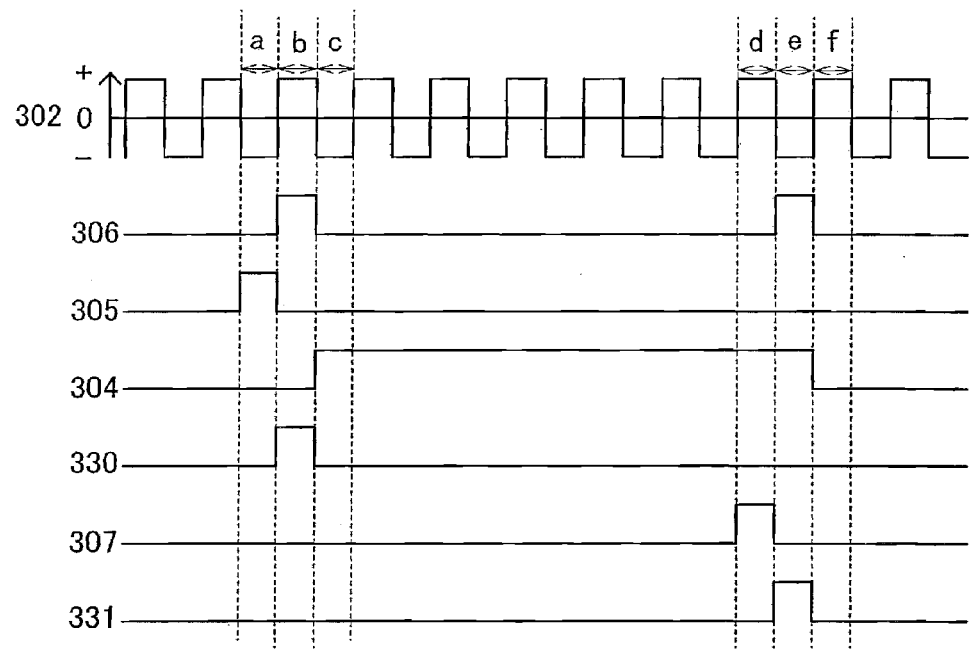
FIG. 5 is a diagram showing a timing chart of a setting-operation of a pixel according to the present invention.

FIG. 5 shows a timing of each control signal of the circuit shown in FIG. 3. That is, each signal line of the data line 302, the scanning line 306, the second comparator initializing line 305, the first comparator initializing line 307, the second data loading line 330, the first data loading line 331, and the comparator selecting line 304 will be explained. A signal of the data line 302 is an AC signal, and a potential of a data signal which is written into one pixel is inverted to be positive or negative in every writing operation. In periods b and e of FIG. 5, the scanning line 306 has a high potential, and writing is performed to the liquid crystal element, but the potential of the data line 302 in the period b and the potential of the data line 302 in the period e are inverted.

First, the following will explain a case where a data signal having a positive potential is written into the liquid crystal element. A writing operation of a data signal having a positive potential into the liquid crystal element is performed in the periods a, b, and c of FIG. 5. When a positive potential is written from the data line 302, a high potential is applied to the second comparator initializing line 305 in the period a to initialize the second comparator 327, and Vref2 is also applied to the second capacitor element 314 to initialize the second comparator 327. Next, a high potential is applied to the second data loading line 330 in the period b, the thirteenth transistor 328 is turned on, and a data potential which is written into the liquid crystal element 310 is written into the second comparator 327. Further, a high potential is applied to the comparator selecting line 304 in the period c, the fifteenth transistor 323 is turned on, the fourteenth transistor 324 is turned off, and the output of the second comparator 327 is transmitted to the light-emitting element 325.

Subsequently, the following will explain a case where a data signal having a negative potential is written into the liquid crystal element. A writing operation of a data signal having a negative potential into the liquid crystal element is performed in the periods d, e, and f of FIG. 5. When a negative potential is written from the data line 302, a high potential is applied to the first comparator initializing line 307 in the period d to initialize the first comparator 326, and Vref1 is applied to the capacitor element 318 to initialize the first comparator 326. Next, a high potential is applied to the first data loading line 331 in the period e, the eleventh transistor 329 is turned on, and a data potential which is written into the liquid crystal element is written into the first comparator 326. Further, a low potential is applied to the comparator selecting line 304 in the period f, the fourteenth transistor 324 is turned on, the fifteenth transistor 323 is turned off, and the output of the first comparator 326 is transmitted to the light-emitting element 325.

According to this embodiment mode, when black is displayed in a display device using a liquid crystal, a backlight is made not to emit light; therefore, light leakage can be eliminated and the contrast can be improved. In addition, according to this embodiment mode, a backlight is arranged in each pixel and a function to control a lighting state of a light-emitting element based on each pixel is provided in a pixel circuit; therefore, a malfunction can be avoided, in which, when a backlight is turned off for a pixel displaying black, all other pixels also display black. Moreover, a backlight in a portion where lighting is not needed can be individually turned off; therefore, power savings can be effectively achieved.

Embodiment Mode 2

Figure 6:
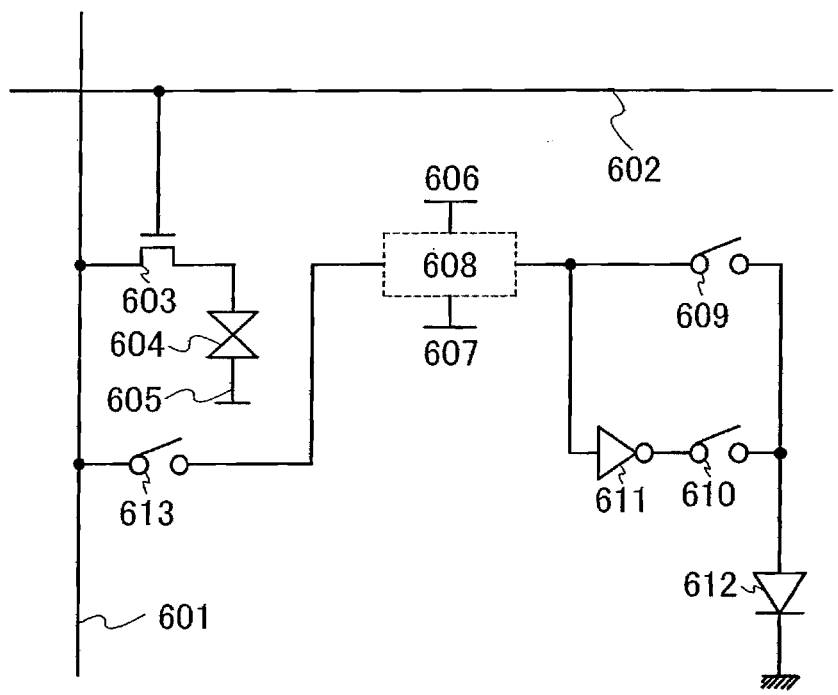
FIG. 6 is a circuit diagram schematically showing a pixel circuit of a display device according to the present invention.

This embodiment mode will explain a configuration of a pixel circuit which is different from that of the above embodiment mode. FIG. 6 schematically shows a circuit in which one comparator is removed from the circuit of Embodiment Mode 1. In the circuit shown in FIG. 6, a data line 601 and a scanning line 602 are provided. In addition, a transistor 603 which performs writing to a liquid crystal element 604 and a counter electrode 605 are provided. Further, a light-emitting element 612 used as a backlight is provided. A first switch 613 which writes a data signal into a comparator 608 is provided. A first reference potential 606 and a second reference potential 607 which are compared with a data potential are provided. In addition, a second switch 609 and a third switch 610, by which it is determined which of positive and negative outputs is output from the comparator to the light-emitting element, are provided.

The components in the circuit shown in FIG. 6 are connected as follows. A first terminal of the transistor 603 is connected to the data line 601, and a first electrode of the liquid crystal element 604 is connected to a second terminal of the transistor 603. A gate terminal of the transistor 603 is connected to the scanning line 602. A first terminal of the first switch 613 is connected to the data line 601. A second electrode of the liquid crystal element 604 is connected to the counter electrode 605. The comparator 608 is connected to a second terminal of the first switch 613. The second switch 609 and an inverter 611 are connected to output of the comparator 608. The output of the comparator 608 is connected to the light-emitting element 612 through the second switch 609, and the third switch 610 is connected to output of the inverter 611 and the light-emitting element 612. The first reference potential 606 and the second reference potential 607 which are compared with a data potential are connected to the comparator 608.

Next, an operation of the circuit will be briefly explained. A data potential written into the liquid crystal element 604 is also input to the comparator 608 through the first switch 613. The comparator 608 compares the data potential input from the data line 601 with a voltage of the first reference potential 606 or the second reference potential 607. When a negative voltage is applied to the liquid crystal element 604 in a normally white liquid crystal, a value of the data potential input from the data line 601 is compared with a value of the first reference potential 606. At that time, the third switch 610 is turned on, and the output of the comparator 608, in which logic is inverted by the inverter 611, is transmitted to the light-emitting element 612. If the potential of the data line 601 is higher than the first reference potential 606, a power source voltage VDD is output to the light-emitting element 612. On the other hand, if the potential of the data line 601 is lower than the first reference potential 606, 0 V is output. The comparator 608 compares the second reference potential 607 with the potential of the data line 601 when a positive voltage is applied to the liquid crystal element 604 in the normally white liquid crystal. At that time, the second switch 609 is turned on, and the output of the comparator is transmitted to the light-emitting element 612. If the potential of the data line 601 is lower than the second reference potential 607, a power source voltage VDD is output to the light-emitting element 612. On the other hand, if the potential of the data line 601 is higher than the second reference potential 607, 0 V is output.

It is to be noted that the light-emitting element 612 may be an LED, an organic EL element, or the like. That is, any light-emitting element which can be controlled by a voltage, a current, or the like may be used.

Figure 7:
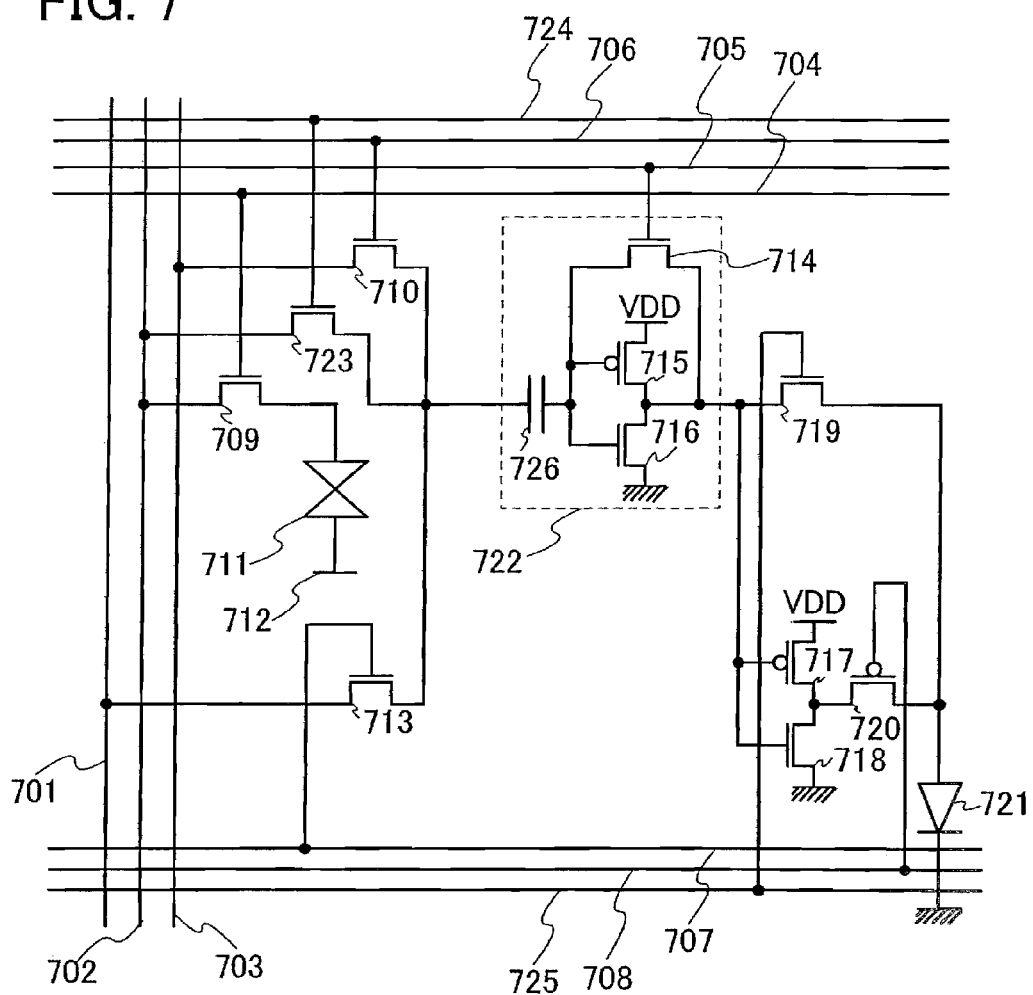
FIG. 7 is a circuit diagram showing a pixel circuit of a display device according to the present invention.

FIG. 7 shows an example of a detailed circuit diagram of the pixel shown in FIG. 6. In the circuit shown in FIG. 7, a data line 702 and a scanning line 704 are provided. A first transistor 709 which performs writing to a liquid crystal element 711 and a counter electrode 712 are provided. The circuit shown in FIG. 7 has a feature in that one CMOS chopper inverter circuit is used as a comparator. In other words, a comparator 722 is used. The comparator 722 includes a capacitor element 726; a second transistor 714; and a first inverter including a third transistor 715 and a fourth transistor 716. As a wiring, a first reference potential line 701, a second reference potential line 703, and the data line 702 are provided. In addition, the scanning line 704, a comparator initializing line 705, a second reference potential selecting line 704, a first reference potential selecting line 707, a first light-emitting element driving signal selecting line 708, a second light-emitting element driving signal selecting line 725, and a data-loading line 724 are provided. A fifth transistor 710, a sixth transistor 723, and a seventh transistor 713 which perform writing to the comparator 722 are provided. An eighth transistor 719 and a ninth transistor 720 which transmit output of the comparator to a light-emitting element are provided. In addition, a second inverter including a tenth transistor 717 and an eleventh transistor 718 is provided. Further, a light-emitting element 721 used as a backlight is provided. It is to be noted that the tenth transistor 717 is a p-channel transistor and the eleventh transistor 718 is an n-channel transistor.

The components in the circuit shown in FIG. 7 are connected as follows. A first terminal of the first transistor 709 and a first terminal of the sixth transistor 723 are connected to the data line 702. A second terminal of the first transistor 709 is connected to a first electrode of the liquid crystal element 711, and a gate terminal of the first transistor 709 is connected to the scanning line 704. A second electrode of the liquid crystal element 711 is connected to the counter electrode 712. A first terminal of the seventh transistor 713 is connected to the first reference potential line 701. A first terminal of the fifth transistor 710 is connected to the second reference potential line 703. A second terminal of the seventh transistor 713, a second terminal of the sixth transistor 723, and a second terminal of the fifth transistor 710 are connected to a first electrode of the capacitor element 726 in the comparator 722. A gate terminal of the sixth transistor 723 is connected to the data loading line 724, and a gate terminal of the first transistor 709 is connected to the scanning line 704. A gate terminal of the fifth transistor 710 is connected to the second reference potential selecting line 706, and a gate terminal of the seventh transistor 713 is connected to the first reference potential selecting line 707. The first inverter includes the third transistor 715 and the fourth transistor 716. Gate terminals of these two transistors are connected to a second electrode of the capacitor element 726 and a first terminal of the second transistor 714 A second terminal of the third transistor 715 and a second terminal of the fourth transistor 716 are connected to a second terminal of the second transistor 714, a first terminal of the eighth transistor 719, and gate terminals of the tenth transistor 717 and the eleventh transistor 718 included in the second inverter. A second terminal of the tenth transistor 717 and a second terminal of the eleventh transistor 718 are connected to a first terminal of the ninth transistor 720. A gate terminal of the second transistor 714 is connected to the comparator initializing line 705. A gate terminal of the eighth transistor 719 is connected to the second light-emitting element driving signal selecting line 725, and a gate terminal of the ninth transistor 720 is connected to the first light-emitting element driving signal selecting line 708. A second terminal of the eighth transistor 719 and a second terminal of the ninth transistor 720 are connected to a first electrode of the light-emitting element 721.

Then, an operation of the circuit shown in FIG. 7 will be explained. When the second reference potential selecting line 706 has a high potential, the fifth transistor 710 is turned on and transmits a potential Vref2 of the second reference potential line 703 to the comparator 722. In addition, when the first reference potential selecting line 707 has a high potential, the seventh transistor 713 is turned on and transmits a potential Vref1 of the first reference potential line 701 to the comparator 722. When the comparator initializing line 705 has a high potential, the second transistor 714 is turned on, and the comparator 722 is initialized. An operation in the comparator 722 is similar to that of the comparator 326.

When the data loading line 724 has a high potential, the sixth transistor 723 is turned on and writes a data potential which is written into the liquid crystal element 711 also into the initialized comparator 722. When the second light-emitting element driving signal selecting line 725 has a high potential, the eighth transistor 719 is turned on and transmits output of the comparator 722, which is obtained when Vref2 is compared with a potential of the data line 702, to the light-emitting element 721. When the first light-emitting element driving signal selecting line 708 has a high potential, the ninth transistor 720 is turned on and transmits output of the comparator 722, which is obtained when Vref1 is compared with a potential of the data line 702, to the light-emitting element 721. It is to be noted that, in this embodiment mode, a CMOS chopper inverter circuit is used as a comparator; however, any circuit may be used as long as its function is achieved.

FIG. 8 shows a timing of each control signal of the circuit shown in FIG. 7. That is, each signal line of the data line 702, the scanning line 704, the comparator initializing line 705, the second reference potential selecting line 706, the first reference potential selecting line 707, the data loading line 724, the second light-emitting element driving signal selecting line 725, and the first light-emitting element driving signal selecting line 708 will be explained. A signal of the data line 702 is an AC signal, and a potential of a data signal which is written into one pixel is inverted to be positive or negative in every writing operation. In periods b and e of FIG. 8, the scanning line 704 has a high potential, and writing is performed to the liquid crystal element, but the potential of the data line 702 in the period b and the potential of the data line 702 in the period e are inverted.

First, the following will explain a case where a data signal having a positive potential is written into the liquid crystal element. A writing operation of a data signal having a positive potential into the liquid crystal element is performed in the periods a, b, and c of FIG. 8. When a positive potential is written from the data line 702, a high potential is applied to the comparator initializing line 705 in the period a to initialize the comparator 722. At the same time, a high potential is applied to the second reference potential selecting line 706, and Vref2 is applied to the capacitor element 726. Next, a high potential is applied to the data loading line 724 in the period b, the sixth transistor 723 is turned on, and a data potential which is written into the liquid crystal element 711 is also written into the comparator 722. Further, a high potential is applied to the second light-emitting element driving signal selecting line 725 in the period c, the eighth transistor 719 is turned on, and output of the comparator 722 is transmitted to the light-emitting element 721.

Subsequently, the following will explain a case where a data signal having a negative potential is written into the liquid crystal element. A writing operation of a data signal having a negative potential into the liquid crystal element is performed in the periods d, and f of FIG. 8. When a negative potential is written from the data line 702, a high potential is applied to the comparator initializing line 705 in the period d to initialize the comparator 722. At the same time, a high potential is applied to the first reference potential selecting line 707, and Vref1 is applied to the capacitor element 726. Next, a high potential is applied to the data loading line 724 in the period e, the sixth transistor 723 is turned on, and a data potential which is written into the liquid crystal element 711 is written into the comparator 722. Further, a high potential is applied to the first light-emitting element driving signal selecting line 708 in the period f, the ninth transistor 720 is turned on, and the output of the comparator 722 is transmitted to the light-emitting element 721 through the tenth transistor 717 and the eleventh transistor 718 included in the second inverter.

In the periods a, b, d, and e of FIG. 8, both the first light-emitting element driving signal selecting line 708 and the second light-emitting element driving signal selecting line 725 have low potentials. This is because there is a period during which logic is indefinite after the comparator is initialized and until the output is determined. Since the light-emitting element is always turned off in this period, the period is preferably suppressed to be so short that it cannot be recognized by human eyes.

According to this embodiment mode, when black is displayed in a display device using a liquid crystal, a backlight is made not to emit light; therefore, light leakage can be eliminated and the contrast can be improved. In addition, according to this embodiment mode, a backlight is arranged in each pixel and a function to control a lighting state of a light-emitting element based on each pixel is provided in a pixel circuit; therefore, a malfunction can be avoided, in which, when a backlight is turned off for a pixel displaying black, all other pixels also display black. Moreover, a backlight in a portion where lighting is not needed can be individually turned off; there, power savings can be effectively achieved. Further, in this embodiment mode, one comparator is removed from the circuit shown in Embodiment Mode 1, and thus, the number of transistors included in the circuit can be reduced, whereby an advantage such as a higher aperture ratio of the pixel can also be obtained.

Embodiment Mode 3

Figure 11A:
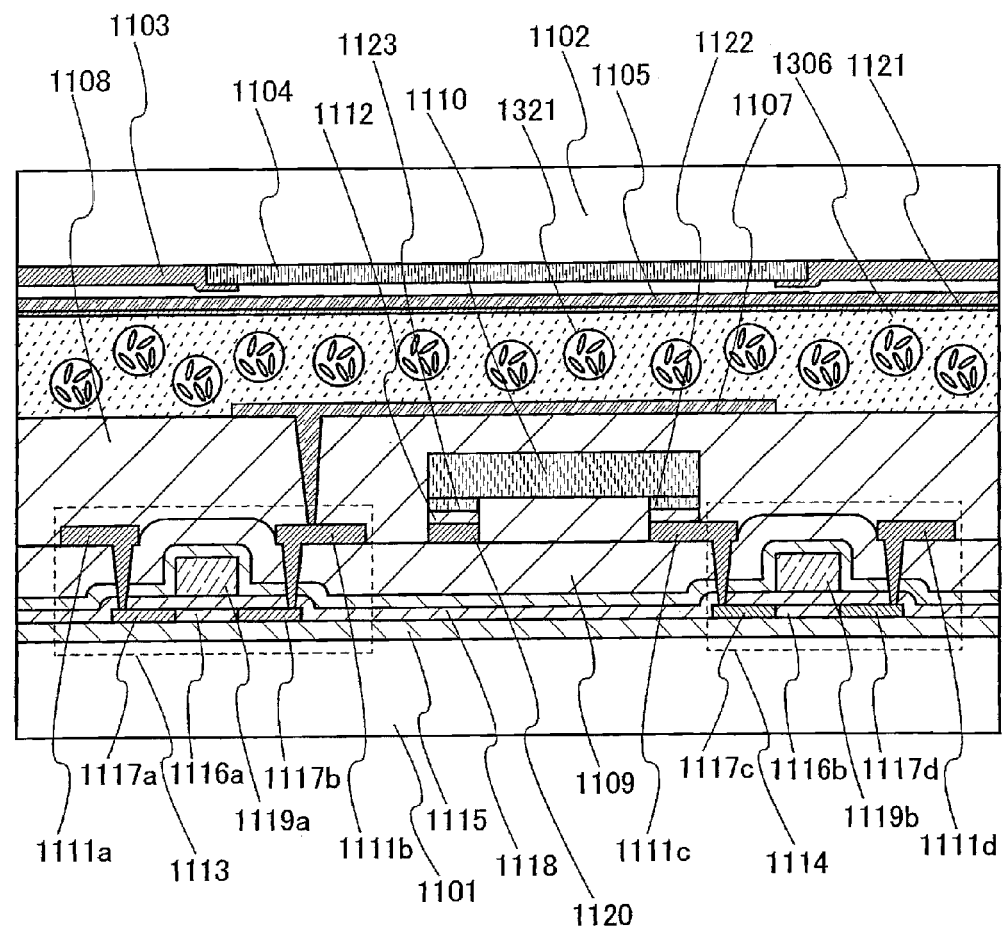
FIGS. 11A to 11C are cross-sectional views each showing a structure of a display device related to Embodiment Mode 3.

FIG. 11A shows one mode of a display device of this embodiment mode. Over a glass substrate 1101, a base film 1115 is formed, and a liquid crystal element driving transistor 1113 and a light-emitting element driving transistor 1114 are formed thereover. The liquid crystal element driving transistor 1113 includes a first impurity region 1117a and a second impurity region 1117b. A first channel region 1116a is formed between the first impurity region 1117a and the second impurity region 1117b. A gate insulating film 1118 is formed over the first impurity region 1117a, the second impurity region 1117b, and the first channel region 1116a. A first gate electrode 1119a is formed over the gate insulating film 1118. Similarly, the light-emitting element driving transistor 1114 includes a third impurity region 1117c and a fourth impurity region 1117d. A second channel region 1116b is formed between the third impurity region 1117c and the fourth impurity region 1117d. The gate insulating film 1118 is formed over the third impurity region 1117c, the fourth impurity region 1117d, and the second channel region 1116b. A second gate electrode 1119b is formed over the gate insulating film 1118. Over the liquid crystal element driving transistor 1113 and the light-emitting element driving transistor 1114, a first interlayer film 1109 is formed, and a first electrode 1111a, a second electrode 1111b, a third electrode 1111c, a fourth electrode 1111d, and a first wiring 1120 are formed. An anisotropic conductive particle 1112 is provided over each of the third electrode 1111c and the first wiring 1120, and a light-emitting diode 1110 is provided thereover. When the light-emitting diode 1110 is a white light-emitting diode, color display can be performed by combining the light-emitting diode 1110 and a color filter. Alternatively, the light-emitting diode 1110 emitting light of red (R), green (G), and blue (B) may be each provided in a pixel to perform color display. Also in this case, the light-emitting diode may be combined with a color filter to improve color purity.

Figure 11B:
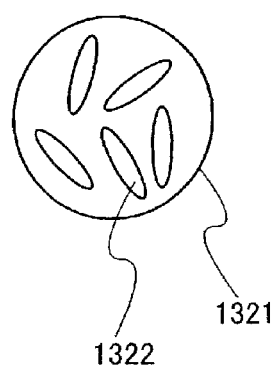
Figure 11C:
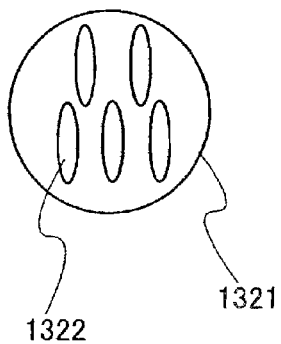

Further, a second interlayer film 1108 is formed over the first interlayer film 1109. A pixel electrode 1107 is formed over the second interlayer film 1108, and a liquid crystal layer 1306 is provided thereover. An alignment film 1121 is provided over the liquid crystal layer 1306, a counter electrode 1105 is formed thereover, and a light-shielding layer 1103 and a color filter 1104 are provided thereover. A glass substrate 1102 that is a counter substrate is provided over the light-shielding layer 1103 and the color filter 1104. A polymer dispersed liquid crystal is preferably used for the liquid crystal layer 1306. As shown in FIG. 11B, the polymer dispersed liquid crystal is a liquid crystal in which liquid crystals 1322 are dispersed in a polymer 1321. When an electric field is applied by dispersion of the microparticle liquid crystals 1322 in the polymer 1321 as shown in FIG. 11C, the liquid crystals are aligned in the polymer 1321, and an alignment film is not necessary. Further, a polarizing plate is not necessary, either. Therefore, the absorption of light can be significantly reduced, and a bright screen can be obtained.

The components in FIG. 11A are connected as follows. In the liquid crystal element driving transistor 1113, the first impurity region 1117a is connected to the first electrode 1111a, and the second impurity region 1117b is connected to the second electrode 1111b. The second electrode 1111b is connected to the pixel electrode 1107. In the light-emitting element driving transistor 1114, the third impurity region 1117c is connected to the third electrode 1111c, and the fourth impurity region 1117d is connected to the fourth electrode 1111d. The third electrode 1111c is connected to a first electrode 1122 of the light-emitting diode 1110 through the anisotropic conductive particle 1112. A second electrode 1123 of the light-emitting diode 1110 is connected to the first wiring 1120 through the anisotropic conductive particle 1112. It is to be noted that other substances such as solder may be used instead of the anisotropic conductive particle 1112 without limitation to the anisotropic conductive particle, as long as the substances can electrically connect the components.

Figure 12:
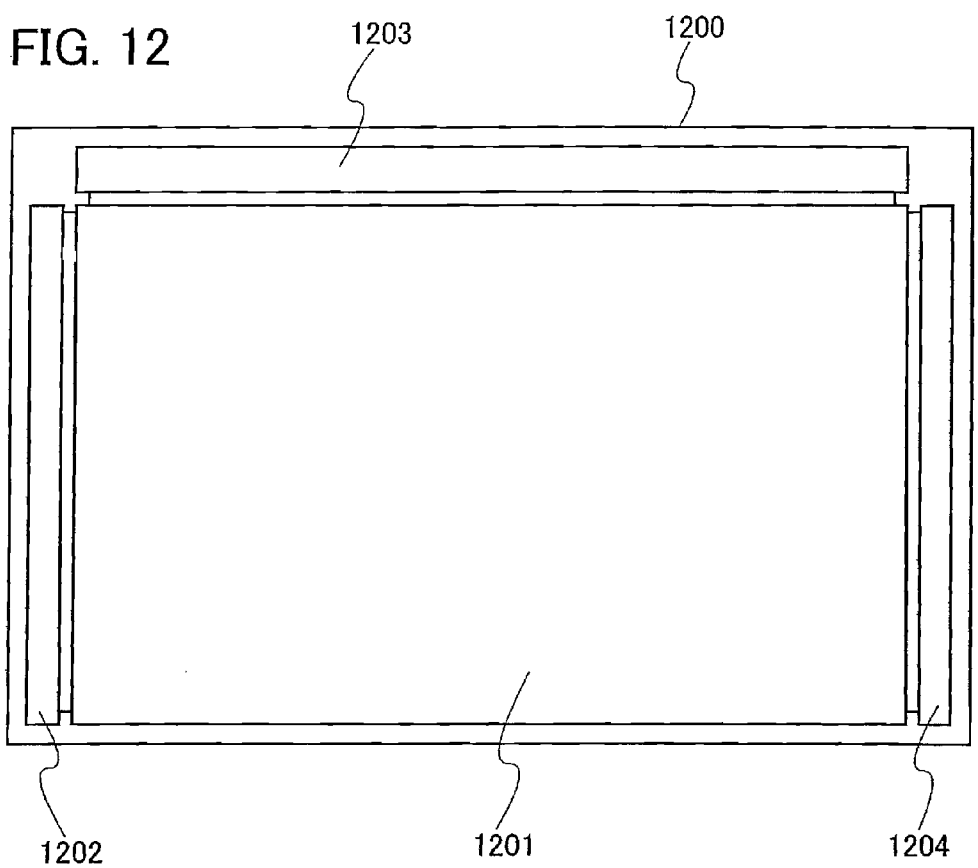
FIG. 12 is a block diagram showing a structure of a display device related to Embodiment Mode 3.

FIG. 12 shows a block diagram of the display device of this embodiment mode. The display device shown in FIG. 12 includes a pixel portion 1201 including a plurality of pixels each having a light-emitting element, a scanning line driving circuit 1202 selecting each pixel, a data line driving circuit 1203 controlling input of a data signal to a selected pixel, and a comparator driving circuit 1204 controlling a comparator in each pixel over a substrate 1200.

According to the display device of this embodiment mode, when black is displayed in a display device using a liquid crystal, a backlight is made not to emit light; therefore, light leakage can be eliminated and the contrast can be improved. In addition, a backlight is arranged in each pixel and a function to control a lighting state of a light-emitting element based on each pixel is provided in a pixel circuit; therefore, a malfunction can be avoided, in which, when a backlight is turned off for a pixel displaying black, all other pixels also display black. Moreover, a backlight in a portion where lighting is not needed can be individually turned off; therefore, power savings can be effectively achieved.

Embodiment Mode 4

Electronic devices using the display device of the present invention include a camera such as a video camera or a digital camera, a goggle type display (head mounted display), a navigation system, an audio reproducing device (such as a car audio stereo or an audio component set), a laptop personal computer, a game machine, a portable information terminal (such as a mobile computer, a mobile phone, a portable game machine, or an electronic book), an image reproducing device provided with a storage medium (specifically, a device for reproducing a storage medium such as a digital versatile disc (DVD) and having a display for displaying the reproduced image), and the like. Specific examples of such electronic devices are shown in FIGS. 9A to 9H.

Figure 9A:
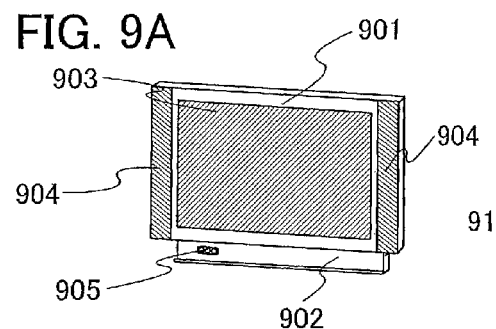
FIGS. 9A to 9H are views each showing an example of an electronic device to which a display device according to the present invention is applied.

FIG. 9A shows a television device, which includes a housing 901, a supporting base 902, a display portion 903, speaker portions 904, a video input terminal 905, and the like. The present invention can be applied to a display device which forms the display portion 903. In accordance with the present invention, an image with the improved contrast can be provided. This television device can be used for receiving TV broadcast as well as for a monitor of a video game machine, computer, or the like.

Figure 9B:
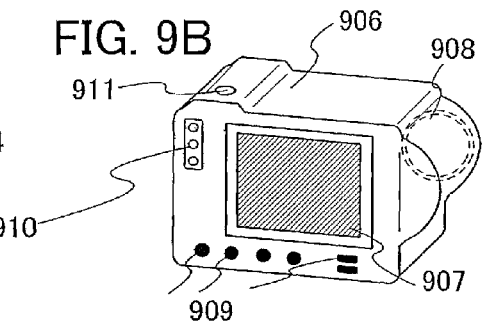

FIG. 9B shows a digital still camera, which includes a main body 906, a display portion 907, an image receiving portion 908, operation keys 909, an external connecting port 910, a shutter release button 911, and the like. The present invention can be applied to a display device which forms the display portion 907. In accordance with the present invention, an image with the improved contrast can be provided.

Figure 9C:
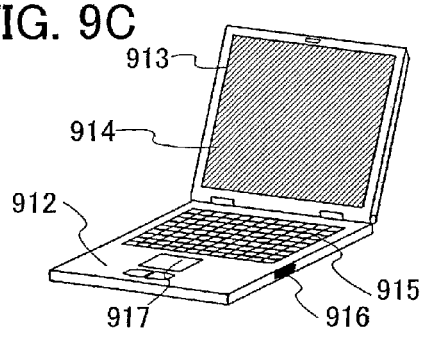

FIG. 9C shows a laptop personal computer, which includes a main body 912, a housing 913, a display portion 914, a keyboard 915, an external connecting port 916, a pointing device 917, and the like. The present invention can be applied to a display device which forms the display portion 914. In accordance with the present invention, an image with the improved contrast can be provided.

Figure 9D:
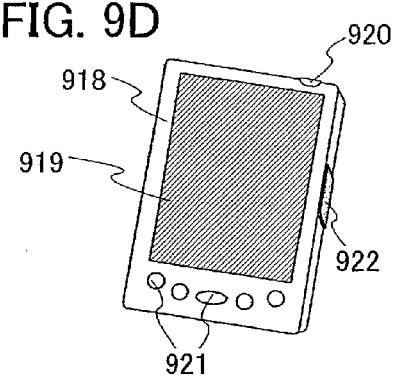

FIG. 9D shows a mobile computer, which includes a main body 918, a display portion 919, a switch 920, operation keys 921, an infrared port 922, and the like. The present invention can be applied to a display device which forms the display portion 919. In accordance with the present invention, an image with the improved contrast can be provided.

Figure 9E:
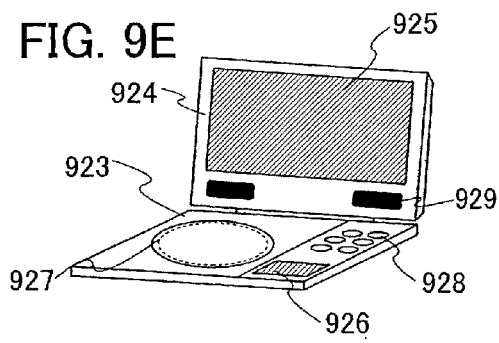

FIG. 9E shows a portable image reproducing device provided with a storage medium (specifically, a DVD player), which includes a main body 923, a housing 924, a display portion A 925, a display portion B 926, a storage medium (such as DVD) reading portion 927, operation keys 928, a speaker portion 929, and the like. The display portion A 925 mainly displays image data, while the display portion B 926 mainly displays text data. The present invention can be applied to display devices which form the display portion A 925 and the display portion B 926. In accordance with the present invention, an image with the improved contrast can be provided. It is to be noted that the image reproducing device provided with a storage medium also includes a home-use game machine and the like.

Figure 9F:
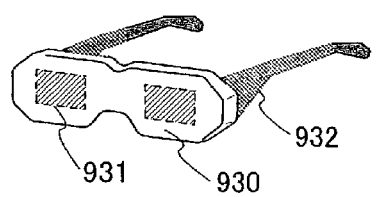

FIG. 9F shows a goggle type display (head mounted display), which includes a main body 930, a display portion 931, an arm portion 932, and the like. The present invention can be applied to a display device which forms the display portion 931. In accordance with the present invention, an image with the improved contrast can be provided.

Figure 9G:
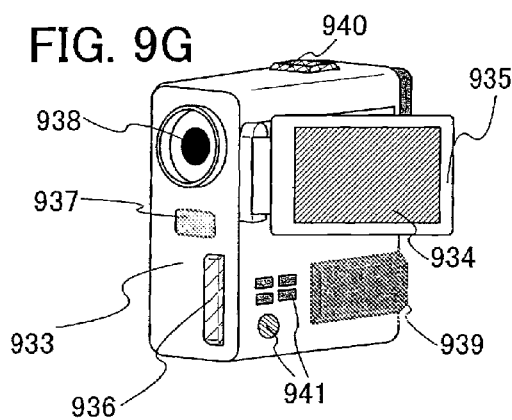

FIG. 9G shows a video camera, which includes a main body 933, a display portion 934, a housing 935, an external connecting port 936, a remote control receiving portion 937, an image receiving portion 938, a battery 939, an audio input portion 940, operation keys 941, and the like. The present invention can be applied to a display device which forms the display portion 934. In accordance with the present invention, an image with the improved contrast can be provided.

Figure 9H:
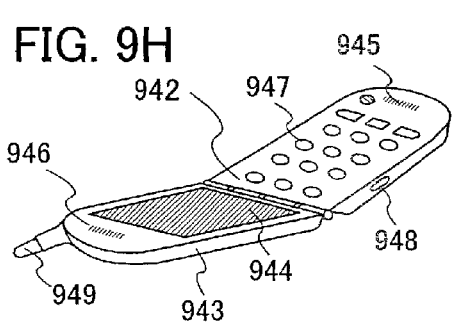

FIG. 9H shows a mobile phone, which includes a main body 942, a housing 943, a display portion 944, an audio input portion 945, an audio output portion 946, operation keys 947, an external connecting port 948, an antenna 949, and the like. The present invention can be applied to a display device which forms the display portion 944. It is to be noted that current consumption of the mobile phone can be suppressed by display of white text on a black background in the display portion 944. In accordance with the present invention, an image with the improved contrast can be provided.

When a light-emitting material with high luminance is used, the display device can be applied to a front projector or a rear projector in which light including output image data is magnified and projected with a lens or the like.

In addition, since a light-emitting device consumes power in its light-emitting portion, it is desirable to display data so that the light-emitting portion is as small as possible. Thus, when a light-emitting device is used in a display portion of a portable information terminal such as a mobile phone or an audio reproducing device, which mainly displays text data, it is desirable to drive the device so that text data is formed by using a light-emitting portion with a non-light-emitting portion on the background.

The applicable range of the present invention is so wide that the present invention can be applied to electronic devices in various fields. In addition, the electronic device of this embodiment mode can employ a display device with any of the configurations shown in Embodiment Modes 1 and 2.

This application is based on Japanese Patent Application serial No. 2006-112533 filed in Japan Patent Office on Apr. 14, 2006, the entire contents of which are hereby incorporated by reference.

What is claimed is:

1. A display device comprising: a plurality of pixels, each of the plurality of pixels comprising: a semiconductor film; a gate electrode over the semiconductor film; an interlayer film over the gate electrode; a first conductive layer over the interlayer film; a second conductive layer over the interlayer film; a light emitting diode over the first conductive layer and the second conductive layer, the light emitting diode comprising a first electrode, a second electrode and a light emitting layer; and a liquid crystal element comprising a third electrode and a fourth electrode, each of the third electrode and the fourth electrode overlapping with the light emitting diode, wherein the first electrode of the light emitting diode is electrically connected to the first conductive layer through a first anisotropic conductive particle, and wherein the second electrode of the light emitting diode is electrically connected to the second conductive layer through a second anisotropic conductive particle.

2. The display device according to claim 1, wherein each of the plurality of pixels further comprises a transistor electrically connected to the first conductive layer.

3. The display device according to claim 1, wherein each of the plurality of pixels further comprises a color filter overlapping with the light emitting diode.

4. The display device according to claim 1, wherein the light emitting diode emits red light, green light or blue light.

5. The display device according to claim 1,
wherein the plurality of pixels includes at least a first pixel, a second pixel and a third pixel,
wherein the light emitting diode in the first pixel emits red light,
wherein the light emitting diode in the second pixel emits green light, and
wherein the light emitting diode in the third pixel emits blue light.

6. The display device according to claim 1, wherein the display device is a television device.

7. The display device according to claim 1, wherein the liquid crystal element comprises a liquid crystal layer comprising a polymer and liquid crystals dispersed in the polymer.

8. The display device according to claim 1, further comprising an insulating film covering the light emitting electrode, and the liquid crystal element over the insulating film.

9. A display device comprising: a plurality of pixels, each of the plurality of pixels comprising: a semiconductor film; a gate electrode over the semiconductor film; an interlayer film over the gate electrode; a first conductive layer over the interlayer film; a second conductive layer over the interlayer film; a light emitting diode over the first conductive layer and the second conductive layer, the light emitting diode comprising a first electrode, a second electrode and a light emitting layer; and a liquid crystal element comprising a third electrode and a fourth electrode, each of the third electrode and the fourth electrode overlapping with the light emitting diode, wherein the first electrode of the light emitting diode is electrically connected to the first conductive layer through a first solder, and wherein the second electrode of the light emitting diode is electrically connected to the second conductive layer through a second solder.

10. The display device according to claim 9, wherein each of the plurality of pixels further comprises a transistor electrically connected to the first conductive layer.

11. The display device according to claim 9, wherein each of the plurality of pixels further comprises a color filter overlapping with the light emitting diode.

12. The display device according to claim 9, wherein the light emitting diode emits red light, green light or blue light.

13. The display device according to claim 9,
wherein the plurality of pixels includes at least a first pixel, a second pixel and a third pixel,
wherein the light emitting diode in the first pixel emits red light,
wherein the light emitting diode in the second pixel emits green light, and
wherein the light emitting diode in the third pixel emits blue light.

14. The display device according to claim 9, wherein the display device is a television device.

15. The display device according to claim 9, wherein the liquid crystal element comprises a liquid crystal layer comprising a polymer and liquid crystals dispersed in the polymer.

16. The display device according to claim 9, further comprising an insulating film covering the light emitting electrode, and the liquid crystal element over the insulating film.

* * * * *